United States Patent
Punke et al.

(10) Patent No.: US 10,215,073 B2
(45) Date of Patent: Feb. 26, 2019

(54) CATALYZED SOOT FILTER FOR USE IN PASSIVE SELECTIVE CATALYTIC REDUCTION

(71) Applicant: BASF Corporation, Florham Park, NJ (US)

(72) Inventors: Alfred Punke, Walle (DE); Gerd Grubert, Hannover (DE); Marcus Hilgendorff, Hannover (DE); Torsten Neubauer, Langenhagen (DE); Matthew Caudle, Hamilton, NJ (US); Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/574,910

(22) PCT Filed: May 18, 2016

(86) PCT No.: PCT/US2016/033015
§ 371 (c)(1),
(2) Date: Nov. 17, 2017

(87) PCT Pub. No.: WO2016/187267
PCT Pub. Date: Nov. 24, 2016

(65) Prior Publication Data
US 2018/0163596 A1 Jun. 14, 2018

Related U.S. Application Data

(60) Provisional application No. 62/163,396, filed on May 19, 2015.

(51) Int. Cl.
*F01N 3/28* (2006.01)
*B01D 53/94* (2006.01)
*B01J 23/44* (2006.01)
*B01J 23/42* (2006.01)
*B01J 37/02* (2006.01)
(Continued)

(52) U.S. Cl.
CPC ......... *F01N 3/2803* (2013.01); *B01D 53/944* (2013.01); *B01D 53/9418* (2013.01); *B01D 53/9422* (2013.01); *B01D 53/9477* (2013.01); *B01J 23/42* (2013.01); *B01J 23/44* (2013.01); *B01J 29/763* (2013.01); *B01J 29/783* (2013.01); *B01J 35/0006* (2013.01); *B01J 35/04* (2013.01); *B01J 37/0234* (2013.01); *B01J 37/0236* (2013.01); *B01J 37/0244* (2013.01); *B01J 37/04* (2013.01); *B01J 37/08* (2013.01); *F01N 3/035* (2013.01); *F01N 3/2066* (2013.01); *F01N 13/009* (2014.06); *B01D 53/9481* (2013.01); *B01D 2255/1021* (2013.01); *B01D 2255/1023* (2013.01); *B01D 2255/50* (2013.01); *B01D 2255/9032* (2013.01); *B01D 2255/9155* (2013.01); *B01D 2255/9202* (2013.01);
(Continued)

(58) Field of Classification Search
CPC ................ B01D 46/00; B01D 46/0001; B01D 46/0027; B01D 46/2418; B01D 53/9418; B01D 2201/62; B01D 2239/0464; B01D 2239/0478; B01D 2239/065; B01D 2255/902; B01D 2255/9155; B01D 2255/102; B01D 2257/402; B01D 2257/404; B01D 2258/01; B01D 2279/30; B01J 15/00; B01J 15/005; B01J 23/40; B01J 35/04; B01J 37/0215; B01J 37/024; B01J 2219/2428; F01N 3/0222; F01N 3/035; F01N 3/2066; F01N 2250/02; F01N 2570/14
See application file for complete search history.

(56) References Cited

U.S. PATENT DOCUMENTS 7,097,817 B2 * 8/2006 Brisley ............. B01D 53/9431
423/245.3
8,012,439 B2 * 9/2011 Arnold .................. B01J 23/464
423/212
(Continued)

FOREIGN PATENT DOCUMENTS

WO 2010/114873 A2 10/2010
WO 2011/041769 A2 4/2011
(Continued)

OTHER PUBLICATIONS

International Search Report and Written Opinion dated Aug. 16, 2016 in PCT/US2016/033015 filed May 18, 2016.
(Continued)

*Primary Examiner* — Timothy C Vanoy
(74) *Attorney, Agent, or Firm* — Oblon, McClelland, Maier & Neustadt, L.L.P.

(57) ABSTRACT

The present invention relates to catalyzed soot filter comprising a porous wall flow substrate, a catalyst for selective catalytic reduction (SCR), a palladium component, and a platinum component, the wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end, and the SCR catalyst is provided on the entire surface of the inlet channel walls and on at least a portion of the surface of the pores within the channel walls underneath the surface of the channel walls coated with the SCR catalyst.

13 Claims, No Drawings

(51) Int. Cl.
*B01J 29/76* (2006.01)
*B01J 29/78* (2006.01)
*B01J 35/04* (2006.01)
*B01J 37/04* (2006.01)
*B01J 37/08* (2006.01)
*B01J 35/00* (2006.01)
*F01N 3/20* (2006.01)
*F01N 3/035* (2006.01)
*F01N 13/00* (2010.01)

(52) U.S. Cl.
CPC .................. *F01N 2510/068* (2013.01); *F01N 2510/0682* (2013.01); *Y02T 10/24* (2013.01)

(56) References Cited

U.S. PATENT DOCUMENTS

| | | | | |
|---|---|---|---|---|
| 8,789,356 | B2* | 7/2014 | Phillips | B01D 53/9418 60/274 |
| 9,662,636 | B2 | 5/2017 | Gramiccioni et al. | |
| 9,764,313 | B2 | 9/2017 | Trukhan et al. | |
| 2012/0124974 | A1 | 5/2012 | Li et al. | |
| 2012/0288427 | A1* | 11/2012 | Grubert | B01D 53/944 423/213.2 |
| 2013/0136662 | A1 | 5/2013 | Choi et al. | |
| 2014/0170045 | A1* | 6/2014 | Fedeyko | B01J 29/74 423/237 |

FOREIGN PATENT DOCUMENTS

| | | |
|---|---|---|
| WO | 2011/140251 A2 | 11/2011 |
| WO | 2012/135871 A1 | 10/2012 |
| WO | 2013/030584 A1 | 3/2013 |

OTHER PUBLICATIONS

International Preliminary Report on Patentability dated Nov. 30, 2017 in PCT/US2016/033015 filed May 18, 2016, 8 pages.
U.S. Appl. No. 15/124,146, filed Sep. 7, 2016, US 2017/0021338 A1, Gerd Grubert, et al.
U.S. Appl. No. 15/683,905, filed Aug. 23, 2017, US 2017/0368541 A1, Natalia Trukhan, et al.
U.S. Appl. No. 14/741,756, filed Jun. 17, 2015, US 2015/0367337 A1, Xiaofan Yang, et al.
U.S. Appl. No. 15/555,131, filed Sep. 1, 2017, Gerd Grubert, et al.
U.S. Appl. No. 15/555,142, filed Sep. 1, 2017, Gerd Grubert, et al.
U.S. Appl. No. 15/562,628, filed Mar. 30, 2015, Roth Stanley, et al.
U.S. Appl. No. 15/555,117, filed Sep. 1, 2017, Xiaofan Yang, et al.
Christopher D. DiGiulio, et al., "Passive-Ammonia Selective Catalytic Reduction (SCR): Understanding $NH_3$ Formation Over Close-Coupled Three Way Catalysts (TWC)" Catalysis Today, vol. 231, 2014, pp. 33-45.

* cited by examiner

CATALYZED SOOT FILTER FOR USE IN PASSIVE SELECTIVE CATALYTIC REDUCTION

TECHNICAL FIELD

The present invention relates to a catalyzed soot filter for the treatment of emissions from an internal combustion engine as well as to a method for its preparation. Furthermore, the present invention relates to a catalyzed soot filter as obtainable from the preparation method as well as to a process for the treatment of emissions from an internal combustion engine and to the use of a catalyzed soot filter according to the present invention.

INTRODUCTION

As summarized in DiGiulio et al in *Catalysis Today* 2014, 231, pp. 33-45, lean-burn engines are more fuel-efficient and produce less $CO_2$ than traditional, stoichiometric-burn engines. Full commercial implementation of lean-burn engines, however, requires the development of cost-effective catalysts capable of meeting current emissions regulations under lean-burn exhaust conditions, which still represents a major technical challenge. Since the late 1970s, three-way catalysts (TWC) have been employed for the simultaneous reduction of nitrogen oxides (NOx) and the oxidation of unburnt hydrocarbons and carbon monoxide (CO) present in the exhaust of stoichiometric-burn engines. However, these TWCs only sufficiently remediate pollutants if operated in a very narrow region near the stoichiometric combustion regime and exhibit very low NOx conversion if operated under the much higher $O_2$ concentrations encountered in lean-burn engine exhausts. Two existing solutions for the reduction of NOx in this case include the lean NOx trap (LNT) and $NH_3$-selective catalytic reduction ($NH_3$—SCR) catalysts. Both LNT and $NH_3$—SCR technologies however suffer from different but significant drawbacks. For example, LNT catalysts require high platinum group metal loadings, resulting in a significant cost per catalyst. $NH_3$—SCR catalysts are less expensive, but the dosing system required to deliver urea to the exhaust stream adds to the total cost of the exhaust system.

As reported in DiGiuglio et al in *Catalysis Today* 2014, 231, pp. 33-45, a new technology referred to as the "passive-ammonia" or "urea-less" SCR approach has been recently demonstrated. As in the case of LNT systems, the passive-$NH_3$ approach is based on a periodic lean-rich cycling, but does not include an LNT catalyst. Instead, a TWC is used to generate $NH_3$ during periods of rich operation. The $NH_3$ thus generated is subsequently stored on a downstream, underfloor SCR catalyst. After a sufficient amount of $NH_3$ has been stored, the engine switches back to lean operation and the stored $NH_3$ is used to reduce NOx that slips un-reacted from the upstream TWC.

Apart from said technologies, efforts have been made to incorporate SCR catalyst technologies in soot filters for increasing the efficiency of exhaust gas treatment, in particular in application involved in the use of a diesel combustion engine. Thus, WO 2012/135871 A1 relates to multi-component filters for emissions control and in particular to a catalytic article comprising a wall flow filter having gas-permeable walls, a hydrolysis catalyst, and an optional soot oxidation catalyst, a selective catalytic reduction catalyst permeating the walls, an ammonia oxidation catalyst and an oxidation catalyst to oxidize CO and hydrocarbons. WO 2011/140251 A2, on the other hand, relates to integrated SCR and ammonia oxidation (ANOX) catalyst systems and in particular to a catalyst system including a first zone to abate nitrogen oxides by selective catalytic reduction, a second zone to oxidize ammonia, and a third zone to oxidize carbon monoxide and hydrocarbons. WO 2011/041769 A2 concerns four-way diesel catalysts for simultaneously remediating the carbon monoxide, nitrogen oxides, particulate matter, and gaseous hydrocarbons present in diesel engine exhaust streams.

In addition to these, multi-component systems have been further proposed in an attempt to provide a highly efficient exhaust gas treatment system. Thus, WO 2010/114873 A2 relates to an emissions treatment system with ammonia-generating and SCR catalysts such as an NOx storage reduction (NSR) catalyst or a lean NOx trap catalyst, and an SCR catalyst disposed downstream of the ammonia-generating catalyst.

Nevertheless, there remains the need for the provision of a highly efficient emissions treatment system operating with the least possible number of components and low amounts of platinum group metals contained therein respectively, yet affording a high efficiency relative to the reduction of both NOx and CO in exhaust gases.

DETAILED DESCRIPTION

It was therefore the object of the present invention to provide a catalyzed soot filter which affords a high conversion of NOx and CO in exhaust gases in addition to the filtration of particulate matter relative to the amount of platinum group metals employed therein, and in particular with respect to the amount of platinum. Furthermore, it was the object of the present invention to provide a catalyzed soot filter which displays an excellent NOx conversion efficiency when employed in a passive SCR system, i.e. when used in combination with a component located upstream thereof which generates ammonia in situ for the conversion of NOx to nitrogen. Thus, it has surprisingly been found that by employing a specific arrangement of an SCR catalyst, a palladium component, and a platinum component in separate portions of a catalyzed soot filter, a high efficiency in NOx conversion and CO oxidation may be obtained using comparatively low amounts of the platinum group metals, and in particular of platinum. Furthermore, it has quite unexpectedly been found that said particularly high efficiency in NOx conversion and CO oxidation may be achieved in a passive SCR system wherein ammonia is generated in situ upstream of the aforementioned catalyzed soot filter.

Therefore, the invention relates to a catalyzed soot filter comprising a porous wall flow substrate, a catalyst for selective catalytic reduction (SCR), a palladium component, and a platinum component, the wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end, wherein the SCR catalyst is provided on the entire surface of the inlet channel walls and on at least a portion of the surface of the pores within the channel walls underneath the surface of the channel walls coated with the SCR catalyst, wherein the palladium component is provided on a portion of the surface of the inlet channel walls and on at least a portion of the surface of the pores within the channel walls underneath the surface of the portions of the channel walls coated with the palladium component, wherein the portion of the inlet channel walls coated with the palladium component extends from the inlet end to x % of the substrate axial length with 0<x<100,
wherein the platinum component is provided on a portion of the surface of the outlet channel walls and on at least a portion of the surface of the pores within the channel walls within the surface of the portions of the channel walls coated with the platinum component, wherein the portion of the outlet channel walls coated with the platinum component extends from the outlet end to 100-x % of the substrate axial length.

As regards the extent to which the respective palladium and platinum components are provided on the respective inlet and outlet channel walls of the catalyzed soot filter according to the present invention, no particular restrictions apply such that in principle any portion of the inlet channel walls may be provided with the palladium component extending from the inlet end to less than the entire substrate axial length, and accordingly any portion of the outlet channel walls may be provided with the platinum component extending from the outlet end to a length less than the entire substrate axial length, provided that the length of the palladium component provided from the inlet end and the length of the platinum component provided from the outlet end amount to the substrate axial length, i.e. 100% thereof. Thus, by way of example, x may range anywhere from of from 5 to 95, wherein it is preferred that x ranges from 15 to 85, more preferably from 25 to 75, more preferably from 35 to 65, and more preferably from 45 to 55.

Regarding the porous wall flow substrate employed in the catalyzed soot filter, no particular restrictions apply as to its shape and dimensions nor with respect to the material with which it is made. According to the present invention, it is, however, preferred that the porous wall flow substrate is a honeycomb substrate with alternately plugged inlet and outlet ends such that each wall of the wall flow substrate respectively has a first surface which is a surface of an inlet channel and a second surface which is a surface of an outlet channel.

Same applies accordingly relative to the porosity of the walls of the wall flow substrate contained in the catalyzed soot filter such that said porosity may range anywhere from 40 to 85%, and preferably ranges from 45 to 80%, more preferably from 50 to 75%, more preferably from 55 to 70%, and more preferably in the range of from 60 to 65%. As regards the porosity as defined in the present application, it is preferred that said porosity is obtained via the mercury intrusion method, more preferably according to ISO 15901-1:2005.

As regards the average pore size of the walls of the wall flow substrate employed in the inventive catalyzed soot filter, again no particular restrictions apply such that wall flow substrates displaying any suitable average pore size may be employed. Thus, by way of example, the average pore size of the walls of the substrate may be in the range of from 5 to 50 µm, and preferably in the range of from 10 to 40 µm, more preferably from 13 to 35 µm, more preferably from 15 to 30 µm, more preferably from 17 to 25 µm, and more preferably from 18 to 22 µm. As for the porosity, it is noted that the average pore size of the walls of the substrate the uncoated wall flow substrate, i.e. prior to providing the SCR catalyst and the palladium and platinum components thereon. Furthermore, as for the porosity of the substrate, also the average pore size of the walls as defined in the present application preferably refers to the average pore size as determined by mercury porosimetry, and more preferably as obtained according to ISO 15901-1:2005.

As noted above, there is no particular restriction relative to the material of which the wall flow substrate consists such that by way of example it may comprise one or more selected from the group consisting of metals, metal oxides, and ceramic materials, wherein preferably the material of which the wall flow filter consists comprises one or more selected from the group consisting of cordierite, aluminum titanate, silicon carbide, and mixtures of two or more thereof, wherein more preferably the wall flow substrate is made of cordierite, aluminum titanate, or silicon carbide, and preferably of silicon carbide.

As regards the SCR catalyst and the palladium component which are both provided on the surface of the inlet channel walls extending from the inlet end, there is no restriction as to which component is directly provided on the surface of the channel walls and on the surface of the pores within the portions of the channel walls coated from the inlet end with both the palladium and SCR components. It is, however, preferred according to the present invention that the palladium component is provided directly on the surface of the channel walls and directly on the surface of the pores within the portions of the channel walls coated with the palladium component in a first coating layer, and the SCR catalyst is provided as a second coating layer on said first coating layer of the palladium component in the portions of the wall flow substrate in which the palladium component is directly provided on the surface of the channel walls and on the surface of the pores with the portions of the channel walls coated with the palladium component.

According to the present invention, the SCR catalyst, the palladium component, and the platinum component are respectively provided on the surface of the channel walls of the wall flow substrate as well as on at least a portion of the surface of the pores within the channel walls underneath the surface of the channel walls coated therewith. Accordingly, the respective catalyst component penetrates the channel walls in the portions of the wall flow substrate on which it is respectively provided such that at least a portion of the pores contained within the walls of the wall flow substrate beneath the portions coated with the respective catalytic component are equally coated therewith. According to the present invention, there is no particular restriction as to the extend to which the pores located within the channel walls underneath the coated portions are themselves coated with the catalyst component such that the possibilities given by the present invention range from only coating the pores within the channel walls located in the immediate vicinity of the surface thereof to the coating of the surface of substantially all of the pores located within the channel walls underneath the surface coated with the respective catalyst component. Within the meaning of the present invention, a coating of the surface of the pores within the channel walls encompasses only a portion of the surface within a given pore being coated with the respective catalyst component. Thus, by way of example, as regards the SCR catalyst, it may be provided on at least a portion of the surface of the pores within the channel walls underneath the surface of the channel walls coated with the SCR catalyst extending from the surface of the inlet channel walls coated with the SCR catalyst to a depth of 10% or more of the thickness of the walls of the uncoated substrate. According to the present invention it is however preferred that the SCR catalyst is provided on at least a portion of the surface of the pores within the channel walls underneath the surface of the channel walls coated with the SCR catalyst extending from the surface of the inlet channel walls coated with the SCR catalyst to a depth of 15% or more of the thickness of the walls of the uncoated substrate, and more preferably to a depth of 20% or more, more preferably of 35% or more, more preferably of 40% or more, more preferably of 50% or more, and more preferably to a depth of 70% or more of the thickness of the walls of the uncoated substrate.

Same applies accordingly with respect to the palladium component, such that according to the present invention the palladium component may be by way of example provided on at least a portion of the surface of the pores within the channel walls underneath the surface of the portions of the channel walls coated with the palladium component extending from the surface of the inlet channel walls coated with the palladium component to a depth of 10% or more of the thickness of the walls of the uncoated substrate, wherein preferably the palladium component is provided on at least a portion of the surface of the pores within the channel walls underneath the surface of the portions of the channel walls coated with the palladium component extending from the surface to a depth of 15% or more, and more preferably of 20% or more, more preferably of 35% or more, more preferably of 40% or more, more preferably of 50% or more, and more preferably to a depth of 70% or more of the thickness of the walls of the uncoated substrate.

As for the SCR catalyst and the palladium component, the platinum component may accordingly be provided by way of example on at least a portion of the surface of the pores within the channel walls underneath the surface of the portions of the channel walls coated with the platinum component extending from the surface of the outlet channel walls coated with the platinum component to a depth of 10% or more of the thickness of the walls of the uncoated substrate, wherein preferably the platinum component is provided on at least a portion of the surface of the pores within the channel walls underneath the surface of the portions of the channel walls coated with the platinum component extending from the surface to a depth of 15% or more, and more preferably to a depth of 20% or more, more preferably of 35% or more, more preferably of 40% or more, more preferably of 50% or more, and more preferably to a depth of 70% or more of the thickness of the walls of the uncoated substrate.

As regards the SCR catalyst comprised in the catalyzed soot filter according to the present invention, no particular restriction applies relative to the materials contained therein provided that the selective catalytic reduction of NOx to $N_2$ via reduction with ammonia may be catalyzed by said material. Thus, any suitable SCR-active material may be comprised in the SCR catalyst. According to the present invention it is however preferred that the SCR catalyst comprises one or more zeolites, and more preferably one or more zeolites having a structure type selected from the group consisting of BEA, CHA, FAU, FER, HEU, LEV, MEI, MEL, MFI, MOR, including mixed structures and combinations of two or more thereof, more preferably from the group consisting of BEA, CHA, LEV, MFI, including mixed structures and combinations of two or more thereof, wherein more preferably the one or more zeolites are of the BEA and/or CHA structure type, preferably of the CHA structure type, wherein more preferably the one or more zeolites comprise chabazite, the one or more zeolites preferably being chabazite.

According to the present invention it is yet further preferred that the one or more zeolites comprised by the SCR catalyst according to any of the particular and preferred embodiments of the present invention contain one or more transition metals. As regards the one or more transition metals preferably contained in the one or more zeolites preferably comprised by the SCR catalyst, no particular restrictions apply such that in principle any conceivable transition metal may be contained therein. It is, however, preferred according to the present invention that the one or more zeolites contain one or more transition metals selected from the group consisting of Pt, Pd, Rh, Cu, Co, Cr, Ni, Fe, V, Nb, and combinations of two or more thereof, more preferably one or more transition metals selected from the group consisting of Cu, Co, Cr, Ni, Fe, and combinations of two or more thereof, wherein more preferably the one or more zeolites contain Cu and/or Fe, preferably Cu.

Regarding the particular and preferred embodiments of the present invention wherein the one or more zeolites preferably comprised in the SCR catalyst of the catalyzed soot filter contain one or more transition metals, there is no particular restriction as to the state in which the respective transition metals are contained in the one or more zeolites and in particular the method according to which the one or more transition metals are introduced into the zeolite. It is however preferred according to the present invention that the one or more transition metals contained in the one or more zeolites preferably comprised in the SCR catalyst have been introduced into the zeolite by ion-exchange and/or by impregnation, wherein it is particularly preferred that the one or more transition metals have been introduced therein by ion-exchange.

As regards the amount in which the one or more preferred zeolites optionally containing one or more transition metals are contained in the catalyzed soot filter of the present invention, no particular restriction applies such that these may be contained therein in any suitable amount. Thus, by way of example, the one or more zeolites optionally containing one or more transition metals may be contained in the catalyzed soot filter as SCR catalyst in an amount ranging anywhere from 0.05 to 5 g/in$^3$ calculated as the total weight of the one or more zeolites, optionally containing one or more transition metals, in the calcined state and based on the total volume of the catalyzed soot filter. It is however preferred according to the present invention that the one or more zeolites optionally containing one or more transition metals are contained in the catalyzed soot filter in an amount ranging from 0.1 to 3.5 g/in$^3$, calculated as the total weight of the one or more zeolites, optionally containing one or more transition metals, in the calcined state and based on the total volume of the catalyzed soot filter, and more preferably from 0.3 to 2.5 g/in$^3$, more preferably from 0.5 to 2 g/in$^3$, more preferably from 0.7 to 1.7 g/in$^3$, more preferably from 0.9 to 1.5 g/in$^3$, more preferably from 1 to 1.3 g/in$^3$, more preferably from 1.05 to 1.15 g/in$^3$.

Within the meaning of the present invention, the term "calcined state" preferably refers to the state of the one or more zeolites optionally containing one or more transition metals after calcining thereof in air at 450° C. for one hour.

Concerning the size of the particles of the SCR catalyst which is provided on the wall flow substrate in the catalyzed soot filter, no particular restrictions apply provided that the particles may be provided not only on the surface of the inlet channel walls but also on at least a portion of the surface of the pores within the channel walls underneath the surface of the channel walls. For achieving this, it is preferred that the average particle size D90 of the SCR catalyst is 25% or less of the average pore size of the walls of the substrate. Thus, by way of example, the average particle size D90 of the SCR catalyst may range anywhere from 0.5 to 20 μm, more preferably the average particle size D90 ranges from 1 to 15

µm, more preferably of from 3 to 10 µm, more preferably of from 4 to 8 µm, and more preferably of from 5 to 7 µm.

According to the present invention, the average particle size D90 refers to the average particle size calculated from the particle size distribution as preferably obtained from laser diffraction and more preferably as obtained according to ISO 13320:2009.

According to the present invention, there is no particular restriction as to the amounts of the palladium component or of the platinum component which may be provided on the catalyzed soot filter. Thus, as concerns the palladium component, it may be contained in the catalyzed soot filter and in particular in the portion of the catalyzed soot filter coated with the palladium component extending from the inlet to x % of the substrate axial length in an amount ranging anywhere from 0.5 to 20 g/ft$^3$ of palladium calculated as the element and based on the volume of the catalyzed soot filter measured from the inlet end up to x % of the substrate axial length. According to the present invention it is however preferred that the palladium component is contained in the portion of the catalyzed soot filter coated with the palladium component extending from the inlet end to x % of the substrate axial length in an amount ranging from 1 to 15 g/ft$^3$, and more preferably from 2 to 10 g/ft$^3$, more preferably from 2.5 to 8 g/ft$^3$, more preferably from 3 to 7 g/ft$^3$, more preferably from 3.5 to 6.5 g/ft$^3$, more preferably from 4 to 6 g/ft$^a$, and more preferably from 4.5 to 5.5 g/ft$^3$.

Same applies accordingly relative to the amount of the platinum component such that it may for example be contained in the catalyzed soot filter and in particular in the portion of the catalyzed soot filter coated with the platinum component extending from the outlet end to 100-x % of the substrate axial length in an amount ranging from 0.05 to 20 g/ft$^3$ of platinum calculated as the element and based on the volume of the catalyzed soot filter measured from the outlet end up to 100-x % of the substrate axial length. According to the present invention it is preferred that the platinum component is contained in the portion of the catalyzed soot filter coated with the platinum component extending from the outlet end to 100-x % of the substrate axial length in an amount ranging from 0.1 to 15 g/ft$^3$, and more preferably in an amount from 0.2 to 10 g/ft$^3$, more preferably from 0.4 to 7 g/ft$^3$, more preferably from 0.6 to 5 g/ft$^3$, more preferably from 0.8 to 4 g/ft$^3$, more preferably from 1 to 3 g/ft$^3$, and more preferably from 1.5 to 2.5 g/ft$^3$. For sake of completeness, it is noted that within the meaning of the present application, the amounts of materials in the catalyzed soot filter and other catalyzed monoliths expressed in grams per cubic inch or grams per cubic feet reflect the loading of the material in question in grams of the (catalytic) component per volume of the monolith. To this effect, the monolith or honeycomb volume is calculated based on its cross-sectional area and length.

According to the present invention, palladium and/or platinum contained in the catalyzed soot filter may be provided on the wall flow substrate in any suitable fashion, such that platinum and/or palladium may be contained directly on the wall flow substrate and/or may be contained in the catalyzed soot filter on a separate support material which is in turn provided on the wall flow substrate. It is however preferred according to the present invention that platinum and/or palladium and preferably both platinum and palladium are supported on a support material and in particular on a particulate support material which in turn is supported on the wall flow substrate of the catalyzed soot filter. Thus, according to the present invention it is preferred that the palladium component comprises palladium supported on a particulate support material and/or, preferably and, the platinum component comprises platinum supported on a particulate support material. As regards the support which may be employed according to said particular and preferred embodiments, no particular restrictions apply such that any suitable particulate support material may be employed to these ends. Thus, by way of example, the particulate support material onto which palladium and/or platinum are respectively supported may, independently from one another, be selected from the group consisting of alumina, silica, alumina-silica, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures of two or more thereof, more preferably from the group consisting of alumina, silica, alumina-silica, titania, titania-alumina, zirconia, zirconia-alumina, lanthana-alumina, titania-zirconia, and mixtures of two or more thereof, more preferably from the group consisting of alumina, silica, alumina-silica, zirconia-alumina, lanthana-alumina, and mixtures of two or more thereof, wherein more preferably the particulate support material comprises alumina-silica, wherein alumina is preferably doped with from 0.5 to 25 wt.-% of silica based on 100 wt.-% of alumina-silica, more preferably from 1 to 15 wt.-% of silica, more preferably from 2 to 10 wt.-% of silica, more preferably from 3 to 8 wt.-% of silica, and more preferably from 4 to 6 wt.-%.

As for the SCR catalyst, no particular restrictions apply relative to the size of the particulate support material onto which palladium and/or platinum are supported provided that the particles may be provided not only on the surface of the respective inlet and outlet channel walls but also on at least a portion of the surface of the pores within the channel walls underneath the surface of the channel walls. For achieving this, it is preferred that the average particle size D90 of the particulate support material onto which palladium and/or platinum are supported is 25% or less of the average pore size of the walls of the substrate. Thus, by way of example, the average particle size D90 of the particulate support material may range anywhere from 0.5 to 20 µm, more preferably the average particle size D90 ranges from 1 to 15 µm, more preferably of from 2 to 10 µm, more preferably of from 3 to 8 µm, and more preferably of from 4 to 6 µm.

According to the present invention, there is no particular restriction as to the amounts in which the particulate support material according to any of the particular and preferred embodiments of the present invention may be contained in the palladium component. Thus by way of example the palladium component may comprise the particulate support material in an amount ranging anywhere from 0.01 to 1 g/in$^3$ based on the volume of the catalyzed soot filter measured from the inlet end up to x % of the substrate axial length, wherein preferably the particulate support material is comprised in the palladium component in an amount ranging from 0.02 to 0.6 g/in$^3$, more preferably from 0.04 to 0.4 g/in$^3$, more preferably from 0.06 to 0.3 g/in$^3$, more preferably from 0.08 to 0.25 g/in$^3$, more preferably from 0.1 to 0.2 g/in$^3$, and more preferably from 0.12 to 0.18 g/in$^3$. According to the present invention it is particularly preferred that the palladium component comprises the particulate support material in an amount ranging from 0.14 to 0.16 g/in$^3$.

Same applies accordingly relative to the particulate support material comprised in the platinum component. There is accordingly no particular restriction as to the amounts in which the particulate support material according to any of the particular and preferred embodiments of the present invention may be contained in the platinum component. Thus by way of example the platinum component may comprise the particulate support material in an amount ranging anywhere from 0.005 to 0.25 g/in$^3$ based on the volume of the catalyzed soot filter measured from the outlet end up to 100-x % of the substrate axial length, wherein preferably the particulate support material is comprised in the platinum component in an amount ranging from 0.01 to 0.15 g/in$^3$, more preferably from 0.02 to 0.1 g/in$^3$, more preferably from 0.03 to 0.08 g/in$^3$, and more preferably from 0.04 to 0.06 g/in$^3$. According to the present invention it is particularly preferred that the platinum component comprises the particulate support material in an amount ranging from 0.045 to 0.055 g/in$^3$.

Finally, as regards the amount in which the SCR catalyst may be contained in the catalyzed soot filter, again no particular restrictions apply such that any suitable amount may be provided thereon. Thus, by way of example, the SCR catalyst may be contained in the catalyzed soot filter in an amount ranging anywhere from 0.05 to 5 g/in$^3$ based on the total volume of the catalyzed soot filter. According to the present invention, it is however preferred that the SCR catalyst is contained in the catalyzed soot filter in an amount ranging from 0.1 to 3.5 g/in$^3$, and more preferably from 0.3 to 2.5 g/in$^3$, more preferably from 0.5 to 2 g/in$^3$, more preferably from 0.7 to 1.7 g/in$^3$, more preferably from 0.9 to 1.5 g/in$^3$, more preferably from 1 to 1.3 g/in$^3$, more preferably from 1.05 to 1.15 g/in$^3$.

According to the present invention, the catalyzed soot filter according to any of the particular and preferred embodiments thereof as defined in the foregoing may be employed as such or in combination with one or more further catalytic and/or non-catalytic components in particular in an exhaust gas line or the like. Thus, the present invention further relates to an emissions treatment system wherein the catalyzed soot filter is contained in said emissions treatment system further comprising an internal combustion engine located upstream of the catalyzed soot filter, wherein the internal combustion engine is in fluid communication with the catalyzed soot filter, and wherein the internal combustion engine is preferably a diesel engine. Furthermore, it is preferred that the emissions treatment system further comprises a lean NOx trap (LNT) which is in fluid communication with the catalyzed soot filter, wherein the LNT is located upstream of the catalyzed soot filter.

Although the inventive catalyzed soot filter is highly effective in an emissions treatment system utilizing passive SCR, it is not excluded that the emissions treatment system according to the present invention may further comprise a means of injecting a source of ammonia and/or one or more hydrocarbons into the exhaust gas stream from the internal combustion engine alternatively to the system wherein ammonia is generated in situ and/or in support of the passive SCR system depending on the specific needs for achieving NOx conversion at a particular point in time. Thus, it is preferred according to the present invention that the emissions treatment system further comprises a means of injecting a source of ammonia and/or one or more hydrocarbons into the exhaust gas stream from the internal combustion engine, wherein said injection means is located upstream of the catalyzed soot filter.

In addition to providing a catalyzed soot filter, the present invention further relates to a method of preparing a catalyzed soot filter and in particular to a method for preparing the inventive catalyzed soot filter according to any of the particular and preferred embodiments thereof as defined in the present application. Therefore, the present invention further relates to a method of preparing a catalyzed soot filter and preferably a method of preparing a catalyzed soot filter according to any of the particular and preferred embodiments of the present application, said method comprising (i) providing a porous wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end, (ii) mixing a particulate support material with distilled water and subsequently adding an aqueous solution of a palladium compound thereto, wherein the resulting mixture is optionally milled for providing a first slurry containing a palladium component, wherein said first slurry displays an average particle size D90 which is 25% or less of the average pore size of the walls of the porous wall flow substrate, (iii) mixing a particulate support material with distilled water and subsequently adding an aqueous solution of a platinum compound thereto, wherein the resulting mixture is optionally milled for providing a second slurry containing a platinum component, wherein said second slurry displays an average particle size D90 which is 25% or less of the average pore size of the walls of the porous wall flow substrate, (iv) suspending a solid SCR catalyst in distilled water and optionally milling the resulting mixture for providing a third slurry, wherein said third slurry displays an average particle size D90 which is 25% or less of the average pore size of the walls of the porous wall flow substrate, (v) coating a portion of the inlet channel walls of the wall flow substrate by immersing the inlet end of the wall flow substrate into the first slurry up to x % of the substrate axial length extending from the inlet end with 0<x<100, (vi) removing the wall flow substrate from the first slurry and removing excess slurry from the inlet channels, preferably by blowing air through the walls of the outlet channels into the coated inlet channels of the wall flow substrate, (vii) coating a portion of the outlet channel walls of the wall flow substrate by immersing the outlet end of the wall flow substrate into the second slurry up to 100-x % of the substrate axial length extending from the outlet end, (viii) removing the wall flow substrate from the second slurry and removing excess slurry from the outlet channels, preferably by blowing air through the walls of the inlet channels into the coated outlet channels of the wall flow substrate, (ix) coating the inlet channel walls of the wall flow substrate by immersing the inlet end of the wall flow substrate into the third slurry along the entire axial length of the substrate yet without allowing slurry to contact the face of the outlet end of the wall flow substrate, (x) removing the wall flow substrate from the third slurry and removing excess slurry from the inlet channels, preferably by blowing air through the walls of the outlet channels into the coated inlet channels of the wall flow substrate, (xi) optionally drying and/or calcining the coated wall flow substrate.

The inventive method for preparing a catalyzed soot filter comprises three steps of coating respective portions of the porous wall flow filter substrate as defined in (v), (vii), and (ix). Between individual coating steps, and after having completed the coating of the porous wall flow substrate, excess slurry from the individual coating steps is respectively removed in steps (vi), (viii), and (x). Finally, the coated porous wall flow substrate is preferably subject in optional step (xi) to a drying and/or calcining step. However, for ensuring that the individual coatings are sufficiently fixed to the wall flow substrate prior to the application of a further coating, it is preferred according to the inventive method that between steps (vi) and (vii) and/or, preferably and, between steps (viii) and (ix) the coated wall flow filter substrate is subject to a step of drying and/or calcining.

As regards the temperature which may be employed in the one or more preferred drying and/or calcining steps employed in the inventive method of preparing a catalyzed soot filter, no particular restrictions apply such that in principle any temperature may be employed for the drying and/or calcining of the coated porous wall flow substrate, respectively. Thus, as regards the drying steps, the individual steps may independently from one another be conducted at a temperature of drying comprised anywhere in the range of from 50 to 200° C., wherein it is preferred that independently of one another the temperature of drying in the one or more steps of drying is in the range of from 70 to 180° C., more preferably from 80 to 150° C., more preferably from 90 to 130° C., and more preferably from 100 to 120° C.

Same applies accordingly with respect to the temperature of calcining in the one or more steps of calcining which may range anywhere from 250 to 800° C., wherein it is preferred according to the inventive method that independently of one another the temperature of calcining in the one or more steps of calcining is in the range of from 300 to 600° C., more preferably of from 350 to 550° C., more preferably of from 400 to 500° C., more preferably of from 430 to 480° C., and more preferably of from 440 to 460° C.

With respect to the duration of the one or more calcining steps comprised by the inventive method, again no particular restrictions apply provided that a calcined coated porous wall flow substrate may be obtained. Thus, by way of example, the duration of calcining in the one or more steps of calcining may independently from one another range from 0.1 to 5 h, wherein it is preferred according to the inventive method that independently from one another the duration of calcining in the one or more steps of calcining is in the range of from 0.3 to 3 h, and more preferably of from 0.5 to 2 h, more preferably of from 0.7 to 1.5 h, more preferably of from 0.8 to 1.3 h, and more preferably of from 0.9 to 1.1 h.

As regards the extent to which the respective first and second slurries are provided on the respective inlet and outlet channel walls of the catalyzed soot filter according to the present invention, no particular restrictions apply such that in principle any portion of the inlet channel walls may be coated with the first slurry extending from the inlet end to less than the entire substrate axial length, and accordingly any portion of the outlet channel walls may be provided with the second slurry extending from the outlet end to a length less than the entire substrate axial length, provided that the length of the first slurry provided from the inlet end and the length of the second slurry provided from the outlet end amount to the substrate axial length, i.e. 100% thereof. Thus, by way of example, x may range anywhere from of from 5 to 95, wherein it is preferred that x ranges from 15 to 85, more preferably from 25 to 75, more preferably from 35 to 65, and more preferably from 45 to 55.

Concerning the palladium compound which may be employed in step (ii) of the inventive method for preparing the first slurry, any conceivable palladium compound may be employed to this effect wherein it is preferred that the palladium compound added as an aqueous solution in step (ii) is a palladium salt, and more preferably a palladium salt selected from the group consisting of palladium nitrate, palladium sulfate, palladium chloride, tetraaminepalladium chloride, and mixtures of two or more thereof, wherein more preferably the palladium salt is palladium nitrate.

Concerning the platinum compound which may be employed in step (iii) of the inventive method for preparing the second slurry, any conceivable platinum compound may be employed to this effect wherein it is preferred that the platinum compound added as an aqueous solution in step (iii) is a platinum salt, and more preferably a platinum salt selected from the group consisting of platinum nitrate, platinum sulfate, platinum chloride, platinum tetra monoethanolamine hydroxide, and mixtures of two or more thereof, wherein more preferably the platinum salt is palladium platinum tetra monoethanolamine hydroxide.

Regarding the porous wall flow substrate which may be employed in step (i) of the inventive method, no particular restrictions apply as to its shape and dimensions nor with respect to the material with which it is made. According to the present invention, it is, however, preferred that the porous wall flow substrate is a honeycomb substrate with alternately plugged inlet and outlet ends such that each wall of the wall flow substrate respectively has a first surface which is a surface of an inlet channel and a second surface which is a surface of an outlet channel.

Same applies accordingly relative to the porosity of the walls of the wall flow substrate which may be employed in step (i) of the inventive method such that said porosity may range anywhere from 40 to 85%, and preferably ranges from 45 to 80%, more preferably from 50 to 75%, more preferably from 55 to 70%, and more preferably in the range of from 60 to 65%. As regards the porosity as defined in the present application, it is preferred that said porosity is obtained via the mercury intrusion method, more preferably according to ISO 15901-1:2005.

As regards the average pore size of the walls of the wall flow substrate which may be employed in the inventive method in step (i), again no particular restrictions apply such that wall flow substrates displaying any suitable average pore size may be employed. Thus, by way of example, the average pore size of the walls of the substrate may be in the range of from 5 to 50 μm, and preferably in the range of from 10 to 40 μm, more preferably from 13 to 35 μm, more preferably from 15 to 30 μm, more preferably from 17 to 25 μm, and more preferably from 18 to 22 μm. As for the porosity, it is noted that the average pore size of the walls of the substrate the uncoated wall flow substrate, i.e. prior to providing the SCR catalyst and the palladium and platinum components thereon. Furthermore, as for the porosity of the substrate, also the average pore size of the walls as defined in the present application preferably refers to the average pore size as determined by mercury porosimetry, and more preferably obtained according to ISO 15901-1:2005.

As noted above, there is no particular restriction relative to the material of which the wall flow substrate provided in step (i) consists such that by way of example it may comprise one or more selected from the group consisting of metals, metal oxides, and ceramic materials, wherein preferably the material of which the wall flow filter consists comprises one or more selected from the group consisting of cordierite, aluminum titanate, silicon carbide, and mixtures of two or more thereof, wherein more preferably the wall flow substrate is made of cordierite, aluminum titanate, or silicon carbide, and preferably of silicon carbide.

As regards the solid SCR catalyst used in the method according to the present invention, no particular restriction applies relative to the materials contained therein provided that the selective catalytic reduction of NOx to $N_2$ via reduction with ammonia may be catalyzed by said material. Thus, any suitable SCR-active material may be comprised in the solid SCR catalyst. According to the present invention it is however preferred that the solid SCR catalyst comprises one or more zeolites, and more preferably one or more zeolites having a structure type selected from the group consisting of BEA, CHA, FAU, FER, HEU, LEV, MEI, MEL, MFI, MOR, including mixed structures and combinations of two or more thereof, more preferably from the group consisting of BEA, CHA, LEV, MFI, including mixed structures and combinations of two or more thereof, wherein more preferably the one or more zeolites are of the BEA and/or CHA structure type, preferably of the CHA structure type, wherein more preferably the one or more zeolites comprise chabazite, the one or more zeolites preferably being chabazite.

According to the present invention it is yet further preferred that the one or more zeolites comprised by the solid SCR catalyst used in (iv) according to any of the particular and preferred embodiments of the inventive method contain one or more transition metals. As regards the one or more transition metals preferably contained in the one or more zeolites preferably comprised by the solid SCR catalyst, no particular restrictions apply such that in principle any conceivable transition metal may be contained therein. It is, however, preferred according to the present invention that the one or more zeolites contain one or more transition metals selected from the group consisting of Pt, Pd, Rh, Cu, Co, Cr, Ni, Fe, V, Nb, and combinations of two or more thereof, more preferably one or more transition metals selected from the group consisting of Cu, Co, Cr, Ni, Fe, and combinations of two or more thereof, wherein more preferably the one or more zeolites contain Cu and/or Fe, preferably Cu.

Regarding the particular and preferred embodiments of the inventive method wherein the one or more zeolites preferably comprised in the solid SCR catalyst of the catalyzed soot filter contain one or more transition metals, there is no particular restriction as to the state in which the respective transition metals are contained in the one or more zeolites and in particular the method according to which the one or more transition metals are introduced into the zeolite. It is however preferred according to the present invention that the one or more transition metals contained in the one or more zeolites preferably comprised in the solid SCR catalyst have been introduced into the zeolite by ion-exchange and/or by impregnation, wherein it is particularly preferred that the one or more transition metals have been introduced therein by ion-exchange.

As regards the amount in which the one or more preferred zeolites optionally containing one or more transition metals are coated onto the wall flow substrate, no particular restriction applies such that these may be coated thereon in any suitable amount. Thus, by way of example, in steps (ix) and (x) the one or more zeolites optionally containing one or more transition metals may be coated onto the wall flow substrate in an amount ranging anywhere from 0.05 to 5 g/in$^3$ calculated as the total weight of the one or more zeolites, optionally containing one or more transition metals, in the calcined state and based on the total volume of the catalyzed soot filter, preferably from 0.1 to 3.5 g/in$^3$. It is, however, preferred according to the present invention that the one or more zeolites optionally containing one or more transition metals are coated onto the wall flow substrate in an amount ranging from 0.3 to 2.5 g/in$^3$, more preferably from 0.5 to 2 g/in$^3$, more preferably from 0.7 to 1.7 g/in$^3$, more preferably from 0.9 to 1.5 g/in$^3$, and more preferably from 1 to 1.3 g/in$^3$. According to the present invention it is particularly preferred that in steps (ix) and (x) the one or more preferred zeolites optionally containing one or more transition metals are coated onto the wall flow substrate in an amount ranging from 1.05 to 1.15 g/in$^3$.

Concerning the size of the particles of the solid SCR catalyst which is contained in the third slurry obtained in step (iv) no particular restrictions apply provided that the particles may be coated in (ix) and (x) not only on the surface of the inlet channel walls but also on at least a portion of the surface of the pores within the channel walls underneath the surface of the channel walls. For achieving this, it is preferred that the average particle size D90 of the solid SCR catalyst is 25% or less of the average pore size of the walls of the substrate. Thus, by way of example, the average particle size D90 of the solid SCR catalyst may range anywhere from 0.5 to 20 µm, wherein more preferably the average particle size D90 ranges from 1 to 15 µm, more preferably of from 3 to 10 µm, more preferably of from 4 to 8 µm, and more preferably of from 5 to 7 µm.

According to the present invention, there is no particular restriction as to the amounts of the palladium component or of the platinum component which may be coated onto the wall flow substrate in (v) and (vi) and in (vii) and (viii), respectively. Thus, as concerns the palladium component, it may be coated onto the wall flow substrate in (v) and (vi) from the inlet to x % of the substrate axial length in an amount ranging anywhere from 0.5 to 20 g/ft$^3$ of palladium calculated as the element and based on the volume of the catalyzed soot filter measured from the inlet end up to x % of the substrate axial length. According to the present invention it is however preferred that the palladium component is coated onto the wall flow substrate extending from the inlet end to x % of the substrate axial length in an amount ranging from 1 to 15 g/ft$^3$, and more preferably from 2 to 10 g/ft$^3$, more preferably from 2.5 to 8 g/ft$^3$, more preferably from 3 to 7 g/ft$^3$, more preferably from 3.5 to 6.5 g/ft$^3$, more preferably from 4 to 6 g/ft$^3$, and more preferably from 4.5 to 5.5 g/ft$^3$.

Same applies accordingly relative to the amount of the platinum component such that it may for example be coated onto the wall flow substrate in (vii) and (viii) extending from the outlet end to 100-x % of the substrate axial length in an amount ranging from 0.05 to 20 g/ft$^3$ of platinum calculated as the element and based on the volume of the catalyzed soot filter measured from the outlet end up to 100-x % of the substrate axial length. According to the present invention it is preferred that the platinum component is coated onto the wall flow substrate extending from the outlet end to 100-x % of the substrate axial length in an amount ranging from 0.1 to 15 g/ft$^3$, and more preferably in an amount from 0.2 to 10 g/ft$^3$, more preferably from 0.4 to 7 g/ft$^3$, more preferably from 0.6 to 5 g/ft$^3$, more preferably from 0.8 to 4 g/ft$^3$, more preferably from 1 to 3 g/ft$^3$, and more preferably from 1.5 to 2.5 g/ft$^3$.

As regards the particulate support material which may be employed in steps (ii) and (iii) for respectively supporting palladium and platinum, no particular restrictions apply such that any suitable particulate support material may be employed to these ends. Thus, by way of example, the particulate support material onto which palladium and/or platinum are respectively supported may, independently from one another, be selected from the group consisting of alumina, silica, alumina-silica, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures of two or more thereof, more preferably from the group consisting of alumina, silica, alumina-silica, titania, titania-alumina, zirconia, zirconia-alumina, lanthana-alumina, titania-zirconia, and mixtures of two or more thereof, more preferably from the group consisting of alumina, silica, alumina-silica, zirconia-alumina, lanthana-alumina, and mixtures of two or more thereof, wherein more preferably the particulate support material comprises alumina-silica, wherein alumina is preferably doped with from 0.5 to 25 wt.-% of silica based on 100 wt.-% of alumina-silica, more preferably from 1 to 15 wt.-% of silica, more preferably from 2 to 10 wt.-% of silica, more preferably from 3 to 8 wt.-% of silica, and more preferably from 4 to 6 wt.-%.

As for the SCR catalyst, no particular restrictions apply relative to the size of the particulate support material onto which palladium and/or platinum are supported in (ii) and (iii) provided that the particles may respectively be coated in (v) and (vi) and in (vii) and (viii) not only on the surface of the inlet and outlet channel walls but also on at least a portion of the surface of the pores within the channel walls underneath the surface of the channel walls. For achieving this, it is preferred that the average particle size D90 of the particulate support material of steps (ii) and (iii) onto which palladium and/or platinum are respectively supported is 25% or less of the average pore size of the walls of the substrate. Thus, by way of example, the average particle size D90 of the particulate respective support material may range anywhere from 0.5 to 20 μm, more preferably the average particle size D90 ranges from 1 to 15 μm, more preferably of from 2 to 10 μm, more preferably of from 3 to 8 μm, and more preferably of from 4 to 6 μm.

According to the present invention, there is no particular restriction as to the amounts in which in steps (v) and (vi) the particulate support material according to any of the particular and preferred embodiments of the inventive method may be coated onto the wall flow substrate. Thus by way of example the particulate support material may be coated onto the wall flow substrate in steps (v) and (vi) in an amount ranging anywhere from 0.01 to 1 g/in$^3$ based on the volume of the catalyzed soot filter measured from the inlet end up to x % of the substrate axial length, wherein preferably the particulate support material is coated in (v) and (vi) in an amount ranging from 0.02 to 0.6 g/in$^3$, more preferably from 0.04 to 0.4 g/in$^3$, more preferably from 0.06 to 0.3 g/in$^3$, more preferably from 0.08 to 0.25 g/in$^3$, more preferably from 0.1 to 0.2 g/in$^3$, and more preferably from 0.12 to 0.18 g/in$^3$. According to the present invention it is particularly preferred that the particulate support material is coated onto the wall flow substrate in steps (v) and (vi) in an amount ranging from 0.14 to 0.16 g/in$^3$.

Same applies accordingly relative to the particulate support material coated onto the wall flow substrate in steps (vii) and (viii). There is accordingly no particular restriction as to the amounts in which the particulate support material according to any of the particular and preferred embodiments of the inventive method may be coated onto the wall flow substrate. Thus by way of example the particulate support material may be coated onto the wall flow substrate in steps (vii) and (viii) in an amount ranging anywhere from 0.005 to 0.25 g/in$^3$ based on the volume of the catalyzed soot filter measured from the outlet end up to 100-x % of the substrate axial length, wherein preferably the particulate support material is coated in (vii) and (viii) in an amount ranging from 0.01 to 0.15 g/in$^3$, more preferably from 0.02 to 0.1 g/in$^3$, more preferably from 0.03 to 0.08 g/in$^3$, and more preferably from 0.04 to 0.06 g/in$^3$. According to the present invention it is particularly preferred that in steps (vii) and (viii) the particulate support material is coated onto the wall flow substrate in an amount ranging from 0.045 to 0.055 g/in$^3$.

Finally, as regards the amount in which the solid SCR catalyst may be coated onto the wall flow substrate in (ix) and (x), again no particular restrictions apply such that any suitable amount may be provided thereon. Thus, by way of example, the solid SCR catalyst may be coated onto the wall flow substrate in (ix) and (x) in an amount ranging anywhere from 0.05 to 5 g/in$^3$ based on the total volume of the catalyzed soot filter. According to the present invention, it is however preferred that in (ix) and (x) the solid SCR catalyst is coated onto the wall flow substrate in an amount ranging from 0.1 to 3.5 g/in$^3$, and more preferably from 0.3 to 2.5 g/in$^3$, more preferably from 0.5 to 2 g/in$^3$, more preferably from 0.7 to 1.7 g/in$^3$, more preferably from 0.9 to 1.5 g/in$^3$, and more preferably from 1 to 1.3 g/in$^3$. According to the present invention it is particularly preferred that in steps (ix) and (x) the solid SCR catalyst is coated onto the wall flow substrate in an amount ranging from 1.05 to 1.15 g/in$^3$.

Besides providing a catalyzed soot filter according to any of the aforementioned particular and preferred embodiments described in the present application, the present application further relates to a catalyzed soot filter obtained and/or obtainable by the inventive method for preparing a catalyzed soot filter according to any of the particular and preferred embodiments thereof as defined in the present application. In particular, the present invention does not only relate to a catalyzed soot filter as may be directly obtained by the inventive method according to any particular and preferred embodiments thereof, i.e. the direct product thereof, but also to any catalyzed soot filter as may be obtained, i.e. as is obtainable according to the inventive method as defined in any of the particular and preferred embodiments thereof irrespective of the actual method according to which the catalyzed soot filter is obtained, provided that it may be obtained by the inventive method according to any of the particular and preferred embodiments thereof.

Furthermore, the present invention also relates to a process for the treatment of emissions from an internal combustion engine comprising directing exhaust gas from an internal combustion engine through the inlet channels of a catalyzed soot filter according to any of the particular and preferred embodiments thereof as defined in the present application.

According to the inventive process, there is no particular restriction as to the further treatment steps which may be employed for treating the exhaust gas from an internal combustion engine either prior to directing the exhaust gas through the inlet channels of a catalyzed soot filter according to any of the particular and preferred embodiments of the present application and/or after having directed the exhaust through said catalyzed soot filter. According to the present invention it is yet further preferred that prior to directing the exhaust gas stream into the catalyzed soot filter, the exhaust gas stream is contacted with a lean NOx trap (LNT). Furthermore, it is yet further preferred according to the present invention that in the inventive process prior to directing the exhaust gas stream into the catalyzed soot filter, a source of ammonia and/or one or more hydrocarbons are injected into the exhaust gas stream, preferably downstream of the LNT.

Finally, the present invention relates to the use of a catalyzed soot filter according to any of the particular and preferred embodiments of the present invention as described in the present application including a catalyzed soot filter as obtained and/or obtainable according to anyone of the particular and preferred embodiments of the inventive process as described in the present application. In principle, there is no restriction whatsoever relative to the application in which the aforementioned catalyzed soot filter may be employed wherein preferably the catalyzed soot filter is used for the treatment of exhaust gas emissions, and preferably for the selective catalytic reduction of NOx in exhaust gas from an internal combustion engine. According to the present invention it is particularly preferred that the catalyzed soot filter according to any of the particular and preferred embodiments as described in the present application is used for the selective catalytic reduction of NOx in exhaust gas from a diesel engine.

The present invention is further characterized by the following particular and preferred embodiments, including the combinations and embodiments indicated by the respective dependencies:

1. A catalyzed soot filter comprising a porous wall flow substrate, a catalyst for selective catalytic reduction (SCR), a palladium component, and a platinum component,
    the wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end,
    wherein the SCR catalyst is provided on the entire surface of the inlet channel walls and on at least a portion of the surface of the pores within the channel walls underneath the surface of the channel walls coated with the SCR catalyst,
    wherein the palladium component is provided on a portion of the surface of the inlet channel walls and on at least a portion of the surface of the pores within the channel walls underneath the surface of the portions of the channel walls coated with the palladium component,
    wherein the portion of the inlet channel walls coated with the palladium component extends from the inlet end to x % of the substrate axial length with 0<x<100,
    wherein the platinum component is provided on a portion of the surface of the outlet channel walls and on at least a portion of the surface of the pores within the channel walls within the surface of the portions of the channel walls coated with the platinum component,
    wherein the portion of the outlet channel walls coated with the platinum component extends from the outlet end to 100-x % of the substrate axial length.
2. The catalyzed soot filter of embodiment 1, wherein x is in the range of from 5 to 95, preferably from 15 to 85, more preferably from 25 to 75, more preferably from 35 to 65, and more preferably from 45 to 55.
3. The catalyzed soot filter of embodiment 1 or 2, wherein the porous wall flow substrate is a honeycomb substrate with alternately plugged inlet and outlet ends such that each wall of the wall flow substrate respectively has a first surface which is a surface of an inlet channel and a second surface which is a surface of an outlet channel.
4. The catalyzed soot filter of any of embodiments 1 to 3, wherein the walls of the substrate display a porosity in the range of from 40 to 85%, preferably from 45 to 80%, more preferably from 50 to 75%, more preferably from 55 to 70%, and more preferably in the range of from 60 to 65%.
5. The catalyzed soot filter of any of embodiments 1 to 4, wherein the average pore size of the walls of the substrate is in the range of from 5 to 50 µm, preferably from 10 to 40 µm, more preferably from 13 to 35 µm, more preferably from 15 to 30 µm, more preferably from 17 to 25 µm, and more preferably from 18 to 22 µm.
6. The catalyzed soot filter of any of embodiments 1 to 5, wherein the material of which the wall flow substrate consists comprises one or more selected from the group consisting of metals, metal oxides, and ceramic materials, preferably one or more selected from the group consisting of cordierite, aluminum titanate, silicon carbide, and mixtures of two or more thereof, wherein more preferably the wall flow substrate is made of cordierite, aluminum titanate, or silicon carbide, and preferably of silicon carbide.
7. The catalyzed soot filter of any of embodiments 1 to 6, wherein the palladium component is provided directly on the surface of the channel walls and directly on the surface of the pores within the portions of the channel walls coated with the palladium component in a first coating layer, and the SCR catalyst is provided as a second coating layer on said first coating layer of the palladium component in the portions of the wall flow substrate in which the palladium component is directly provided on the surface of the channel walls and on the surface of the pores with the portions of the channel walls coated with the palladium component.
8. The catalyzed soot filter of any of embodiments 1 to 7, wherein the SCR catalyst is provided on at least a portion of the surface of the pores within the channel walls underneath the surface of the channel walls coated with the SCR catalyst extending from the surface of the inlet channel walls coated with the SCR catalyst to a depth of 10% or more of the thickness of the walls of the uncoated substrate, preferably to a depth of 15% or more, more preferably to a depth of 20% or more, more preferably of 35% or more, more preferably of 40% or more, more preferably of 50% or more, and more preferably to a depth of 70% or more of the thickness of the walls of the uncoated substrate.
9. The catalyzed soot filter of any of embodiments 1 to 8, wherein the palladium component is provided on at least a portion of the surface of the pores within the channel walls underneath the surface of the portions of the channel walls coated with the palladium component extending from the surface of the inlet channel walls coated with the palladium component to a depth of 10% or more of the thickness of the walls of the uncoated substrate, preferably to a depth of 15% or more, more preferably to a depth of 20% or more, more preferably of 35% or more, more preferably of 40% or more, more preferably of 50% or more, and more preferably to a depth of 70% or more of the thickness of the walls of the uncoated substrate.
10. The catalyzed soot filter of any of embodiments 1 to 9, wherein the platinum component is provided on at least a portion of the surface of the pores within the channel walls underneath the surface of the portions of the channel walls coated with the platinum component extending from the surface of the outlet channel walls coated with the platinum component to a depth of 10% or more of the thickness of the walls of the uncoated substrate, preferably to a depth of 15% or more, more preferably to a depth of 20% or more, more preferably of 35% or more, more preferably of 40% or more, more preferably of 50% or more, and more preferably to a depth of 70% or more of the thickness of the walls of the uncoated substrate.

11. The catalyzed soot filter of any of embodiments 1 to 10, wherein the SCR catalyst comprises one or more zeolites, preferably one or more zeolites having a structure type selected from the group consisting of BEA, CHA, FAU, FER, HEU, LEV, MEI, MEL, MFI, MOR, including mixed structures and combinations of two or more thereof, more preferably from the group consisting of BEA, CHA, LEV, MFI, including mixed structures and combinations of two or more thereof, wherein more preferably the one or more zeolites are of the BEA and/or CHA structure type, preferably of the CHA structure type, wherein more preferably the one or more zeolites comprise chabazite, the one or more zeolites preferably being chabazite.

12. The catalyzed soot filter of embodiment 11, wherein the one or more zeolites contain one or more transition metals, preferably one or more transition metals selected from the group consisting of Pt, Pd, Rh, Cu, Co, Cr, Ni, Fe, V, Nb, and combinations of two or more thereof, more preferably one or more transition metals selected from the group consisting of Cu, Co, Cr, Ni, Fe, and combinations of two or more thereof, wherein more preferably the one or more zeolites contain Cu and/or Fe, preferably Cu.

13. The catalyzed soot filter of embodiment 12, wherein the one or more transition metals have been introduced into the zeolite by ion-exchange and/or by impregnation, preferably by ion-exchange.

14. The catalyzed soot filter of any of embodiments 11 to 13, wherein the one or more zeolites optionally containing one or more transition metals are contained in the catalyzed soot filter in an amount ranging from 0.05 to 5 $g/in^3$ calculated as the total weight of the one or more zeolites, optionally containing one or more transition metals, in the calcined state and based on the total volume of the catalyzed soot filter, preferably from 0.1 to 3.5 $g/in^3$, more preferably from 0.3 to 2.5 $g/in^3$, more preferably from 0.5 to 2 $g/in^3$, more preferably from 0.7 to 1.7 $g/in^3$, more preferably from 0.9 to 1.5 $g/in^3$, more preferably from 1 to 1.3 $g/in^3$, more preferably from 1.05 to 1.15 g/in.

15. The catalyzed soot filter of any of embodiments 1 to 13, wherein the average particle size D90 of the SCR catalyst is 25% or less of the average pore size of the walls of the substrate and is preferably in the range of from 0.5 to 20 μm, more preferably of from 1 to 15 μm, more preferably of from 3 to 10 μm, more preferably of from 4 to 8 μm, and more preferably of from 5 to 7 μm.

16. The catalyzed soot filter of any of embodiments 1 to 14, wherein the palladium component is contained in the portion of the catalyzed soot filter coated with the palladium component extending from the inlet end to x % of the substrate axial length in an amount ranging from 0.5 to 20 $g/ft^3$ of palladium calculated as the element and based on the volume of the catalyzed soot filter measured from the inlet end up to x % of the substrate axial length, preferably in an amount ranging from 1 to 15 $g/ft^3$, more preferably from 2 to 10 $g/ft^3$, more preferably from 2.5 to 8 $g/ft^3$, more preferably from 3 to 7 $g/ft^3$, more preferably from 3.5 to 6.5 $g/ft^3$, more preferably from 4 to 6 $g/ft^3$, and more preferably from 4.5 to 5.5 $g/ft^3$.

17. The catalyzed soot filter of any of embodiments 1 to 15, wherein the platinum component is contained in the portion of the catalyzed soot filter coated with the platinum component extending from the outlet end to 100-x % of the substrate axial length in an amount ranging from 0.05 to 20 $g/ft^3$ of platinum calculated as the element and based on the volume of the catalyzed soot filter measured from the outlet end up to 100-x % of the substrate axial length, preferably in an amount ranging from 0.1 to 15 $g/ft^3$, more preferably from 0.2 to 10 $g/ft^3$, more preferably from 0.4 to 7 $g/ft^3$, more preferably from 0.6 to 5 $g/ft^3$, more preferably from 0.8 to 4 $g/ft^3$, more preferably from 1 to 3 $g/ft^3$, and more preferably from 1.5 to 2.5 $g/ft^3$.

18. The catalyzed soot filter of any of embodiments 1 to 16, wherein the palladium component comprises palladium supported on a particulate support material and/or, preferably and, the platinum component comprises platinum supported on a particulate support material, wherein independently from one another the particulate support material is preferably selected from the group consisting of alumina, silica, alumina-silica, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures of two or more thereof, more preferably from the group consisting of alumina, silica, alumina-silica, titania, titania-alumina, zirconia, zirconia-alumina, lanthana-alumina, titania-zirconia, and mixtures of two or more thereof, more preferably from the group consisting of alumina, silica, alumina-silica, zirconia-alumina, lanthana-alumina, and mixtures of two or more thereof, wherein more preferably the particulate support material comprises alumina-silica, wherein alumina is preferably doped with from 0.5 to 25 wt.-% of silica based on 100 wt.-% of alumina-silica, more preferably from 1 to 15 wt.-% of silica, more preferably from 2 to 10 wt.-% of silica, more preferably from 3 to 8 wt.-% of silica, and more preferably from 4 to 6 wt.-%.

19. The catalyzed soot filter of embodiment 17, wherein independently from one another the average particle size D90 of the particulate support material is 25% or less of the average pore size of the walls of the substrate and is preferably in the range of from 0.5 to 20 μm, more preferably of from 1 to 15 μm, more preferably of from 2 to 10 μm, more preferably of from 3 to 8 μm, and more preferably of from 4 to 6 μm.

20. The catalyzed soot filter of embodiment 17 or 18, wherein in the portion of the inlet channel walls coated with the palladium component extending from the inlet end to x % of the substrate axial length, the palladium component comprises the particulate support material in an amount in the range of from 0.01 to 1 $g/in^3$ based on the volume of the catalyzed soot filter measured from the inlet end up to x % of the substrate axial length, preferably from 0.02 to 0.6 $g/in^3$, more preferably from 0.04 to 0.4 $g/in^3$, more preferably from 0.06 to 0.3 $g/in^3$, more preferably from 0.08 to 0.25 $g/in^3$, more preferably from 0.1 to 0.2 $g/in^3$, more preferably from 0.12 to 0.18 $g/in^3$, more preferably from 0.14 to 0.16 $g/in^3$.

21. The catalyzed soot filter of any of embodiments 17 to 19, wherein in the portion of the inlet channel walls coated with the platinum component extending from the outlet end to 100-x % of the substrate axial length, the platinum component comprises the particulate support material in an amount in the range of from 0.005 to 0.25 $g/in^3$ based on the volume of the catalyzed soot filter measured from the outlet end up to 100-x % of the substrate axial length, preferably from 0.01 to 0.15 $g/in^3$, more preferably from 0.02 to 0.1 $g/in^3$, more preferably from 0.03 to 0.08 $g/in^3$, more preferably from 0.04 to 0.06 $g/in^3$, more preferably from 0.045 to 0.055 $g/in^3$.

22. The catalyzed soot filter of any of embodiments 1 to 20, wherein the SCR catalyst is contained in the catalyzed soot filter in an amount ranging from 0.05 to 5 $g/in^3$ based on the total volume of the catalyzed soot filter, preferably from 0.1 to 3.5 g/in³, more preferably from 0.3 to 2.5 g/in³, more preferably from 0.5 to 2 g/in³, more preferably from 0.7 to 1.7 g/in³, more preferably from 0.9 to 1.5 g/in³, more preferably from 1 to 1.3 g/in³, more preferably from 1.05 to 1.15 g/in³.

23. The catalyzed soot filter of any of embodiments 1 to 22, wherein the catalyzed soot filter is contained in an emissions treatment system further comprising an internal combustion engine located upstream of the catalyzed soot filter, wherein the internal combustion engine is in fluid communication with the catalyzed soot filter, and wherein the internal combustion engine is preferably a diesel engine.

24. The catalyzed soot filter of embodiment 23, wherein the emissions treatment system further comprises a lean NOx trap (LNT) in fluid communication with the catalyzed soot filter, wherein the LNT is located upstream of the catalyzed soot filter.

25. The catalyzed soot filter of embodiment 23 or 24, wherein the emissions treatment system further comprises a means of injecting a source of ammonia and/or one or more hydrocarbons into the exhaust gas stream from the internal combustion engine, wherein said injection means is located upstream of the catalyzed soot filter, and is preferably located downstream of the LNT.

26. A method of preparing a catalyzed soot filter, preferably of a catalyzed soot filter according to any of embodiments 1 to 22, comprising
   (i) providing a porous wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end,
   (ii) mixing a particulate support material with distilled water and subsequently adding an aqueous solution of a palladium compound thereto, wherein the resulting mixture is optionally milled for providing a first slurry containing a palladium component, wherein said first slurry displays an average particle size D90 which is 25% or less of the average pore size of the walls of the porous wall flow substrate,
   (iii) mixing a particulate support material with distilled water and subsequently adding an aqueous solution of a platinum compound thereto, wherein the resulting mixture is optionally milled for providing a second slurry containing a platinum component, wherein said second slurry displays an average particle size D90 which is 25% or less of the average pore size of the walls of the porous wall flow substrate,
   (iv) suspending a solid SCR catalyst in distilled water and optionally milling the resulting mixture for providing a third slurry, wherein said third slurry displays an average particle size D90 which is 25% or less of the average pore size of the walls of the porous wall flow substrate,
   (v) coating a portion of the inlet channel walls of the wall flow substrate by immersing the inlet end of the wall flow substrate into the first slurry up to x % of the substrate axial length extending from the inlet end with 0<x<100,
   (vi) removing the wall flow substrate from the first slurry and removing excess slurry from the inlet channels, preferably by blowing air through the walls of the outlet channels into the coated inlet channels of the wall flow substrate,
   (vii) coating a portion of the outlet channel walls of the wall flow substrate by immersing the outlet end of the wall flow substrate into the second slurry up to 100-x % of the substrate axial length extending from the outlet end,
   (viii) removing the wall flow substrate from the second slurry and removing excess slurry from the outlet channels, preferably by blowing air through the walls of the inlet channels into the coated outlet channels of the wall flow substrate,
   (ix) coating the inlet channel walls of the wall flow substrate by immersing the inlet end of the wall flow substrate into the third slurry along the entire axial length of the substrate yet without allowing slurry to contact the face of the outlet end of the wall flow substrate,
   (x) removing the wall flow substrate from the third slurry and removing excess slurry from the inlet channels, preferably by blowing air through the walls of the outlet channels into the coated inlet channels of the wall flow substrate,
   (xi) optionally drying and/or calcining the coated wall flow substrate.

27. The method of embodiment 26, wherein between steps (vi) and (vii) and/or, preferably and, between steps (viii) and (ix) the coated wall flow filter substrate is subject to a step of drying and/or calcining.

28. The method of embodiment 26 or 27, wherein independently of one another the temperature of drying in the one or more steps of drying is in the range of from 50 to 200° C., preferably from 70 to 180° C., more preferably from 80 to 150° C., more preferably from 90 to 130° C., and more preferably from 100 to 120° C.

29. The method of any of embodiments 26 to 28, wherein independently of one another the temperature of calcining in the one or more steps of calcining is in the range of from 250 to 800° C., preferably of from 300 to 600° C., more preferably of from 350 to 550° C., more preferably of from 400 to 500° C., more preferably of from 430 to 480° C., and more preferably of from 440 to 460° C.

30. The method of any of embodiments 26 to 29 wherein independently from one another, the duration of calcining in the one or more steps of calcining is in the range of from 0.1 to 5 h, preferably of from 0.3 to 3 h, more preferably of from 0.5 to 2 h, more preferably of from 0.7 to 1.5 h, more preferably of from 0.8 to 1.3 h, and more preferably of from 0.9 to 1.1 h.

31. The method of any of embodiments 26 to 30, wherein x is in the range of from 5 to 95, preferably from 15 to 85, more preferably from 25 to 75, more preferably from 35 to 65, and more preferably from 45 to 55.

32. The method of any of embodiments 26 to 31, wherein in step (ii) the palladium compound is a palladium salt, preferably a palladium salt selected from the group consisting of palladium nitrate, palladium sulfate, palladium chloride, tetraaminepalladium chloride, and mixtures of two or more thereof, wherein more preferably the palladium salt is palladium nitrate.

33. The method of any of embodiments 26 to 32, wherein in step (iii) the platinum compound is a platinum salt, preferably a platinum salt selected from the group consisting of platinum nitrate, platinum sulfate, platinum chloride, platinum tetra monoethanolamine hydroxide, and mixtures of two or more thereof, wherein more preferably the platinum salt is palladium platinum tetra monoethanolamine hydroxide.

34. The method of any of embodiments 26 to 33, wherein the porous wall flow substrate provided in step (i) is a honeycomb substrate with alternately plugged inlet and outlet ends such that each wall of the wall flow substrate respectively has a first surface which is a surface of an inlet channel and a second surface which is a surface of an outlet channel 35. The method of any of embodiments 26 to 34, wherein the walls of the porous wall flow substrate provided in step (i) display a porosity in the range of from 40 to 85%, preferably from 45 to 80%, more preferably from 50 to 75%, more preferably from 55 to 70%, and more preferably in the range of from 60 to 65%.

36. The method of any of embodiments 26 to 35, wherein the average pore size of the walls of the porous wall flow substrate provided in step (i) is in the range of from 5 to 50 μm, preferably from 10 to 40 μm, more preferably from 13 to 35 μm, more preferably from 15 to 30 μm, more preferably from 17 to 25 μm, and more preferably from 18 to 22 μm.

37. The method of any of embodiments 26 to 36, wherein the material of which the porous wall flow substrate provided in step (i) consists comprises one or more selected from the group consisting of metals, metal oxides, and ceramic materials, preferably one or more selected from the group consisting of cordierite, aluminum titanate, silicon carbide, and mixtures of two or more thereof, wherein more preferably the wall flow substrate is made of cordierite, aluminum titanate, or silicon carbide, and preferably of silicon carbide.

38. The method of any of embodiments 26 to 37, wherein the solid SCR catalyst comprises one or more zeolites, preferably one or more zeolites having a structure type selected from the group consisting of BEA, CHA, FAU, FER, HEU, LEV, MEI, MEL, MFI, MOR, including mixed structures and combinations of two or more thereof, more preferably from the group consisting of BEA, CHA, LEV, MFI, including mixed structures and combinations of two or more thereof, wherein more preferably the one or more zeolites are of the BEA and/or CHA structure type, preferably of the CHA structure type, wherein more preferably the one or more zeolites comprise chabazite, the one or more zeolites preferably being chabazite 39. The method of embodiment 38, wherein the one or more zeolites contain one or more transition metals, preferably one or more transition metals selected from the group consisting of Pt, Pd, Rh, Cu, Co, Cr, Ni, Fe, V, Nb, and combinations of two or more thereof, more preferably one or more transition metals selected from the group consisting of Cu, Co, Cr, Ni, Fe, and combinations of two or more thereof, wherein more preferably the one or more zeolites contain Cu and/or Fe, preferably Cu.

40. The method of embodiment 39, wherein the one or more transition metals have been introduced into the zeolite by ion-exchange and/or by impregnation, preferably by ion-exchange.

41. The method of any of embodiments 38 to 40, wherein in steps (ix) and (x) the one or more zeolites optionally containing one or more transition metals are coated onto the wall flow substrate in an amount ranging from 0.05 to 5 $g/in^3$ calculated as the total weight of the one or more zeolites, optionally containing one or more transition metals, in the calcined state and based on the total volume of the catalyzed soot filter, preferably from 0.1 to 3.5 $g/in^3$, more preferably from 0.3 to 2.5 $g/in^3$, more preferably from 0.5 to 2 $g/in^3$, more preferably from 0.7 to 1.7 $g/in^3$, more preferably from 0.9 to 1.5 $g/in^3$, more preferably from 1 to 1.3 $g/in^3$, more preferably from 1.05 to 1.15 $g/in^3$.

42. The method of any of embodiments 26 to 41, wherein in step (iv) the average particle size D90 of the solid SCR catalyst is comprised in the range of from 0.5 to 20 μm, preferably of from 1 to 15 μm, more preferably of from 3 to 10 μm, more preferably of from 4 to 8 μm, and more preferably of from 5 to 7 μm.

43. The method of any of embodiments 26 to 42, wherein in steps (v) and (vi) the palladium component is coated onto the wall flow substrate in an amount ranging from 0.5 to 20 g/ft of palladium calculated as the element and based on the volume of the catalyzed soot filter measured from the inlet end up to x % of the substrate axial length, preferably in an amount ranging from 1 to 15 $g/ft^3$, more preferably from 2 to 10 $g/ft^3$, more preferably from 2.5 to 8 $g/ft^3$, more preferably from 3 to 7 $g/ft^3$, more preferably from 3.5 to 6.5 $g/ft^3$, more preferably from 4 to 6 $g/ft^3$, and more preferably from 4.5 to 5.5 $g/ft^3$.

44. The method of any of embodiments 26 to 43, wherein in steps (vii) and (viii) the platinum component is coated onto the wall flow substrate in an amount ranging from 0.05 to 20 $g/ft^3$ of platinum calculated as the element and based on the volume of the catalyzed soot filter measured from the outlet end up to 100-x % of the substrate axial length, preferably in an amount ranging from 0.1 to 15 $g/ft^3$, more preferably from 0.2 to 10 $g/ft^3$, more preferably from 0.4 to 7 $g/ft^3$, more preferably from 0.6 to 5 $g/ft^3$, more preferably from 0.8 to 4 $g/ft^3$, more preferably from 1 to 3 $g/ft^3$, and more preferably from 1.5 to 2.5 $g/ft^3$.

45. The method of any of embodiments 26 to 44, wherein independently from one another the particulate support material of steps (ii) and (iii) is selected from the group consisting of alumina, silica, alumina-silica, titania, titania-alumina, zirconia, zirconia-alumina, baria-alumina, ceria, ceria-alumina, baria-ceria-alumina, lanthana-alumina, lanthana-zirconia-alumina, titania-zirconia, and mixtures of two or more thereof, preferably from the group consisting of alumina, silica, alumina-silica, titania, titania-alumina, zirconia, zirconia-alumina, lanthana-alumina, titania-zirconia, and mixtures of two or more thereof, more preferably from the group consisting of alumina, silica, alumina-silica, zirconia-alumina, lanthana-alumina, and mixtures of two or more thereof, wherein more preferably the particulate support material comprises alumina-silica, wherein alumina is preferably doped with from 0.5 to 25 wt.-% of silica based on 100 wt.-% of alumina-silica, more preferably from 1 to 15 wt.-% of silica, more preferably from 2 to 10 wt.-% of silica, more preferably from 3 to 8 wt.-% of silica, and more preferably from 4 to 6 wt.-%.

46. The method of any of embodiments 26 to 45, wherein independently from one another the average particle size D90 of the particulate support material of steps (ii) and (iii) is in the range of from 0.5 to 20 μm, preferably of from 1 to 15 μm, more preferably of from 2 to 10 μm, more preferably of from 3 to 8 μm, and more preferably of from 4 to 6 μm.

47. The method of any of embodiments 26 to 46, wherein in steps (v) and (vi) the particulate support material is coated onto the wall flow substrate in an amount in the range of from 0.01 to 1 $g/in^3$ based on the volume of the catalyzed soot filter measured from the inlet end up to x % of the substrate axial length, preferably from 0.02 to 0.6 $g/in^3$, more preferably from 0.04 to 0.4 g/in$^3$, more preferably from 0.06 to 0.3 g/in$^3$, more preferably from 0.08 to 0.25 g/in$^3$, more preferably from 0.1 to 0.2 g/in$^3$, more preferably from 0.12 to 0.18 g/in$^3$, more preferably from 0.14 to 0.16 g/in$^3$.

48. The method of any of embodiments 26 to 47, wherein in steps (vii) and (viii) the particulate support material is coated onto the wall flow substrate in an amount in the range of from 0.005 to 0.25 g/in$^3$ based on the volume of the catalyzed soot filter measured from the outlet end up to 100-x % of the substrate axial length, preferably from 0.01 to 0.15 g/in$^3$, more preferably from 0.02 to 0.1 g/in$^3$, more preferably from 0.03 to 0.08 g/in$^3$, more preferably from 0.04 to 0.06 g/in$^3$, more preferably from 0.045 to 0.055 g/in$^3$.

49. The method of any of embodiments 26 to 48, wherein in steps (ix) and (x) the SCR catalyst is coated onto the wall flow substrate in an amount ranging from 0.05 to 5 g/in$^3$ based on the total volume of the catalyzed soot filter, preferably from 0.1 to 3.5 g/in$^3$, more preferably from 0.3 to 2.5 g/in$^3$, more preferably from 0.5 to 2 g/in$^3$, more preferably from 0.7 to 1.7 g/in$^3$, more preferably from 0.9 to 1.5 g/in$^3$, more preferably from 1 to 1.3 g/in$^3$, more preferably from 1.05 to 1.15 g/in$^3$.

50. A catalyzed soot filter, preferably according to any of embodiments 1 to 22, which is obtainable and/or obtained according to a method according to any of embodiments 26 to 49.

51. A process for the treatment of emissions from an internal combustion engine comprising directing exhaust gas from an internal combustion engine through the inlet channels of a catalyzed soot filter according to any of embodiments 1 to 22 or 50.

52. The process of embodiment 51, wherein prior to directing the exhaust gas stream into the catalyzed soot filter, the exhaust gas stream is contacted with a lean NO$_x$ trap (LNT).

53. The process of embodiment 51 or 52 wherein prior to directing the exhaust gas stream into the catalyzed soot filter, a source of ammonia and/or one or more hydrocarbons are injected into the exhaust gas stream, preferably downstream of the LNT.

54. Use of a catalyzed soot filter according to any of embodiments 1 to 22 or 50 for the treatment of exhaust gas emissions, preferably for the selective catalytic reduction of NO$_x$ in exhaust gas from an internal combustion engine, and more preferably for the selective catalytic reduction of NO$_x$ in exhaust gas from a diesel engine.

EXPERIMENTAL SECTION

Comparative Example 1: SCR Coated Inlet

Copper Chabazite (Cu-CHA) was suspended in water to make a slurry with a solid content of 39 wt.-%, after which the slurry was milled to D$_{90}$=6 μm. A wall flow filter honeycomb substrate made of silicon carbide with a porosity of 63% with a mean pore size of 20 μm as determined by mercury porosimetry, respectively, and a volume of 2.47 liter was provided. The CuCHA slurry was coated from the inlet side of the filter. To this effect the substrate was immersed into the slurry with inlet side down and with the outlet side held ¼ inch (2.54 cm) above the slurry level. The substrate was pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in 100% of the inlet side of the filter being coated with 1.1 g/in$^3$ (g/(2.54 cm)$^3$) Cu-CHA.

Comparative Example 2: SCR Coated Inlet+Pt Coated Outlet (100%)

Copper Chabazite (Cu-CHA: Chabazite ion-exchanged with 3.3 wt.-% Cu calculated as CuO; SiO$_2$/Al$_2$O$_3$=24.8) was suspended in water to make a slurry with a solid content of 39 wt.-%, after which the slurry was milled to D$_{90}$=6 μm. Separately, a pre-milled Al$_2$O$_3$ powder doped with 5% SiO$_2$ (90% of the particles are less than 5 micrometers: D$_{90}$=5 μm) was suspended in water to reach 15 wt.-% solid content. A platinum tetra monoethanolamine hydroxide solution (18 wt.-% in H$_2$O) was added into the suspension drop-wise while stirring to afford a loading of 1.1 wt.-% of Pt on the alumina powder doped with 5 wt.-% silica.

A wall flow filter honeycomb substrate made of silicon carbide with a porosity of 63% with a mean pore size of 20 μm and a volume of 2.47 liter was provided. Firstly, the Pt slurry was coated from the outlet side of the filter. The substrate was immersed into the slurry with outlet side down and with the inlet side held ¼ inch (2.54 cm) above the slurry level. The substrate was pulled out of the slurry, and a stream of air was blown from the inlet side of the channels until no washcoat slurry was coming out from the outlet side. The coated sample was then dried at 110° C. for 2 hours and calcined in air at 450° C. for 1 hour, resulting in 100% of the outlet side of the filter being coated with 1.0 g/ft$^3$ (g/(30.48 cm)$^3$) Pt on 0.05 g/in$^3$ (g/(2.54 cm)$^3$) Al$_2$O$_3$ powder doped with 5% SiO$_2$.

Finally, the Cu-CHA slurry was then coated from the inlet side along the entire length of the filter by immersing the substrate the entire length of the inlet side, with the outlet side held inch (2.54 cm) above the slurry level. After blowing off the excess slurry from the outlet side, the coated sample was then dried at 110° C. for 2 hours and calcined in air at 450° C. for 1 hour, resulting in 100% of the inlet side of the filter being coated with 1.1 g/in$^3$ (g/(2.54 cm)$^3$) Cu-CHA.

Comparative Example 3: SCR Coated Inlet+Pd Coated Outlet (100%)

Copper Chabazite (CuCHA) was suspended in water to make a slurry with a solid content of 39%, after which this slurry was milled to D$_{90}$=6 μm. Separately, a pre-milled Al$_2$O$_3$ powder doped with 5% SiO$_2$ (90% of the particles are less than 5 micrometers: D$_{90}$=5 μm) was suspended in water to reach 25% solid content. A palladium nitrate solution (20 wt.-% in H$_2$O) was added into the suspension drop-wise while stirring to afford a loading of 0.95 wt.-% of Pd on the alumina powder doped with 5 wt.-% silica.

A wall flow filter honeycomb substrate made of silicon carbide with a porosity of 63% with a mean pore size of 20 μm and a volume of 2.47 liter was provided. Firstly, the Pd slurry was coated from the outlet side of the filter. To this effect, the substrate was immersed into the slurry with outlet side down with the inlet side held % inch (2.54 cm) above the slurry level. The substrate was pulled out of the slurry, and a stream of air was blown from the inlet side of the channels until no washcoat slurry was coming out from the outlet side. The coated sample was then dried at 110° C. for 2 hours and calcined in air at 450° C. for 1 hour, resulting in 100% of the outlet side of the filter being coated with 2.5 g/ft$^3$ (g/(30.48 cm)$^3$) Pd on 0.15 g/in$^3$ (g/(2.54 cm)$^3$) Al$_2$O$_3$ powder doped with 5% SiO$_2$.

Finally, the Cu-CHA slurry was then coated from the inlet side along the entire length of the filter by immersing the substrate the entire length of the inlet side, with the outlet side held ¼ inch (2.54 cm) above the slurry level. After blowing off the excess slurry from the outlet side, the coated sample was then dried at 110° C. for 2 hours and calcined in air at 450° C. for 1 hour, resulting in the below indicated percentage of the inlet side of the filter being coated with 1.1 g/in$^3$ (g/(2.54 cm)$^3$) CuCHA.

Comparative Example 4: SCR Coated Inlet+Pd Coated Outlet (50%)

A coated wall flow filter honeycomb substrate was obtained as in Comparative Example 3, wherein the Pd slurry was only coated on 50% of the outlet side of the filter at twice the loading of Pd. To this effect a palladium nitrate solution (20 wt.-% in H$_2$O) was added into the suspension of the pre-milled Al$_2$O$_3$ powder doped with 5% SiO$_2$ drop-wise while stirring to afford a loading of 1.9 wt.-% of Pd on the alumina powder doped with 5 wt.-% silica. Furthermore, in the step of coating of the substrate with the Pd containing slurry, the outlet side of the substrate was immersed into the slurry up to 50% of the axial length of the substrate with the inlet side held 50% of total substrate length above the slurry level resulting after drying in 50% of the outlet side of the filter being coated with 5 g/ft$^3$ (g/(30.48 cm)$^3$) Pd on 0.15 g/in$^3$ (g/(2.54 cm)$^3$) Al$_2$O$_3$ powder doped with 5% SiO$_2$.

Example 1: SCR Coated Inlet+(5 g/ft$^3$) Pd Coated Inlet (50%)+(1 g/in$^3$) Pt Coated Outlet (50%)

Copper Chabazite (Cu-CHA: Chabazite ion-exchanged with 3.3 wt.-% Cu calculated as CuO; SiO$_2$/Al$_2$O$_3$=24.8) was suspended in water to make a slurry with a solid content of 39 wt.-%, after which the slurry was milled to D$_{90}$=6 μm. Separately, a pre-milled Al$_2$O$_3$ powder doped with 5% SiO$_2$ (90% of the particles are less than 5 micrometers: D$_{90}$=5 μm) was suspended in water to reach 25 wt.-% solid content. A palladium nitrate solution (20 wt.-% in H$_2$O) was added into the suspension drop-wise while stirring to afford a loading of 1.9 wt.-% of Pd on the alumina powder doped with 5 wt.-% silica. Separately, a pre-milled Al$_2$O$_3$ powder doped with 5 wt.-% SiO$_2$ (90% of the particles are less than 5 micrometers: D$_{90}$=5 μm) was suspended in water to reach 15% solid contents. A platinum tetra monoethanolamine hydroxide solution (18 wt.-% in H$_2$O) was added into the suspension drop-wise while stirring to afford a loading of 1.1 wt.-% of Pt on the alumina powder doped with 5 wt.-% silica.

A wall flow filter honeycomb substrate made of silicon carbide with a porosity of 63% with a mean pore size of 20 μm and a volume of 2.47 liter was provided. Firstly, the Pd slurry was coated from the inlet side of the filter. To this effect, the inlet side of the substrate was immersed into the slurry up to 50% of the axial length of the substrate with the outlet side held 50% of total substrate length above the slurry level in order to result in the 50% inlet coverage. The substrate was then pulled out of the slurry, and a stream of air was blown from the outlet side of the channels until no washcoat slurry was coming out from the inlet side. The coated sample was then dried at 110° C. for 2 hours and calcined in air at 450° C. for 1 hour, resulting in 50% of the inlet side of the filter being coated with 5 g/ft$^3$ (g/(30.48 cm)$^3$) Pd on 0.15 g/in$^3$ (g/(2.54 cm)$^3$) Al$_2$O$_3$ powder doped with 5% SiO$_2$.

Then, the Pt slurry was coated from the outlet side of the filter. To this effect, the outlet side of the substrate was immersed into the slurry up to 50% of the axial length of the substrate with the inlet side held 50% of the total substrate length above the slurry level. The substrate was then pulled out of the slurry, and a stream of air was blown from the inlet side of the channels until no washcoat slurry was coming out from the outlet side. The coated sample was then dried at 110° C. for 2 hours and calcined in air at 450° C. for 1 hour, resulting in 50% of the outlet side of the filter being coated with 1 g/ft$^3$ Pt on 0.05 g/in$^3$ (g/(2.54 cm)$^3$) Al$_2$O$_3$ powder doped with 5% SiO$_2$.

Finally, the CuCHA slurry was coated from the inlet side along the entire length of the filter in the same manner as for Pd on the alumina powder doped with silica was coated on the inlet side, yet by immersing the substrate the entire length of the inlet side, with the outlet side held ¼ inch (2.54 cm) above the slurry level. After blowing off the excess slurry from the outlet side, the coated sample was then dried at 110° C. for 2 hours and calcined in air at 450° C. for 1 hour, resulting in the 100% of the inlet side of the filter being coated with 1.1 g/in$^3$ (g/(2.54 cm)$^3$) of Cu-CHA.

Example 2: SCR Coated Inlet+(5 g/ft$^3$) Pd Coated Inlet (50%)+(3 g/in$^3$) Pt Coated Outlet (50%)

A coated wall flow filter honeycomb substrate was obtained as in Example 1, wherein an increased loading of Pt was loaded onto the alumina powder doped with 5 wt.-% silica which is coated on the outlet side of the wall flow filter honeycomb substrate. More specifically, a platinum tetra monoethanolamine hydroxide solution (18 wt.-% in H$_2$O) was added into the suspension drop-wise while stirring to afford a loading of 1.1 wt.-% of Pt on the alumina powder doped with 5 wt.-% silica. Accordingly, a coated wall flow filter honeycomb substrate was obtained as for Example 1, wherein 50% of the outlet side of the filter was coated with 3 g/ft$^3$ Pt as opposed to 1 g/ft$^3$ for the coated filter according to Example 1.

Example 3: Passive SCR in Lean/Rich (L/R) Testing Including NH$_3$ Slip Measurement The lean/rich cycle test is an engine test consisting of seven lean/rich cycles conducted here at 300° C. (lean NOx trap (LNT) catalyst temperature). At the start of the test a rich operation of 30 seconds is conducted to assure all nitrates are desorbed from the LNT. After the cycles have been stabilized, the NOx conversion and NH$_3$ slip is taken as the mean value from a lean phase only. The LNT has a volume of 1.85 dm$^3$ and a PGM loading of 120 g/ft$^3$ and is aged 20 h at 750° C. on a diesel engine. The catalyzed soot filters according to the examples and comparative examples were placed downstream of the LNT in the set-up for testing.

TABLE 1

Engine conditions at 300° C. employed in lean/rich (L/R) SCR testing.

| | T inlet [° C.] | Lambda | Cycle Time [s] | Flow [m$^3$/h] | Engine Out | | | |
|---|---|---|---|---|---|---|---|---|
| | | | | | NOx [ppm] | HC [ppm] | CO [ppm] | O2 [ppm] |
| Lean Conditions | 300 | 2.4 | 140 | 100 | 420 | 41 | 230 | 13.9 |
| Rich Conditions | 300 to 450 | 0.95 | 15 | 65 | 230 | 1300 | 2.3 | 0.13 |

TABLE 2

Results for the examples and comparative examples in the lean/rich SCR test relative to $NO_x$-conversion and $NH_3$-slip.

|  | Pd-loading [g/ft³] | Pt-loading [g/ft³] | NH₃ Slip [mg] | NO_x Conversion [%] |
|---|---|---|---|---|
| Comp. Ex. 1 | 0 | 0 | 100 | 70 |
| Comp. Ex. 2 | 0 | 1 (100%) | 25 | 47 |
| Comp. Ex. 3 | 2.5 (100%) | 0 | 49 | 66 |
| Comp. Ex. 4 | 5 (50%) | 0 | 49 | 66 |
| Example 1 | 5 (50%) | 1 (50%) | 23 | 52 |
| Example 2 | 5 (50%) | 3 (50%) | 16 | 43 |

Thus, as may be taken from the results in Table 2, the SCR tests the $NH_3$-slip may be considerably reduced without substantially impairing the catalyzed soot filters capacity of selective catalytic reduction of nitrogen oxides contained in the exhaust gas. In particular, as may be taken from the results obtained for Comparative Example 2 and for Examples 1 and 2, by concentrating Pt on the lower portion of the outlet passages and substituting Pt with Pd in the upper portion of the inventive catalyst, it has unexpectedly been found that it is possible to considerably reduce $NH_3$-slip while maintaining the $NO_x$ conversion at a level comparable to a catalyst wherein a comparable amount of Pt is distributed over the entire length of the outlet channels.

Example 4: Soot Regeneration and Determination of CO-Slip

During soot oxidation a high amount of CO is produced which needs to be oxidized to $CO_2$ over the filter substrate by the oxidation catalyst. The filter substrates of the examples and comparative examples were tested for CO oxidation during active filter regeneration of soot loading filter (secondary CO emission). Prior testing, the samples were loaded with 11 g/l soot in the exhaust stream of a 4 cylinder light duty diesel engine with 2 L engine displacement.

For active regeneration testing each of the samples was placed downstream of a standard diesel oxidation catalyst (DOC) in the exhaust line of a 4 cylinder light duty diesel engine with 2 L displacement. The temperature in front of the catalyzed soot filter was raised to 620° C. for 10 min, after which the CO concentration was monitored. The amount of $CO_2$ generated from soot burning was determined by the CO emissions of the uncoated filter substrate.

TABLE 3

Results for the examples and comparative examples in the SCR tests relative to CO-slip.

|  | Pd-loading [g/ft³] | Pt-loading [g/ft³] | CO-slip [ppm] |
|---|---|---|---|
| Comp. Ex. 1 | 0 | 0 | 420 |
| Comp. Ex. 2 | 0 | 1 (100%) | 100 |
| Comp. Ex. 3 | 2.5 (100%) | 0 | 50 |
| Comp. Ex. 4 | 5 (50%) | 0 | 180 |
| Example 1 | 5 (50%) | 1 (50%) | 160 |
| Example 2 | 5 (50%) | 3 (50%) | 38 |

As may be taken from the results displayed in Table 3, the inventive catalysts display a reduced CO-slip compared to Comparative Example 1 which contains no platinum group metal as well as compared to Comparative Example 4 containing Pd provided in the outlet channels. At higher Pt loadings, however, as employed in Example 2, it has unexpectedly been found that the inventive catalyst displays a CO-slip which is clearly superior to those obtained using the comparative examples, and in particular compared to Comparative Examples 2 and 3 wherein comparable amount of Pt and Pd are respectively distributed over the entire length of the outlet channels.

The invention claimed is:

1. A catalyzed soot filter comprising a porous wall flow substrate, a catalyst for selective catalytic reduction (SCR), a palladium component, and a platinum component,
    the wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end,
    wherein the SCR catalyst is on the entire surface of the inlet channel walls and on at least a portion of the surface of the pores within the channel walls underneath the surface of the channel walls coated with the SCR catalyst,
    wherein the palladium component is on a portion of the surface of the inlet channel walls and on at least a portion of the surface of the pores within the channel walls underneath the surface of the portions of the channel walls coated with the palladium component,
    wherein the portion of the inlet channel walls coated with the palladium component extends from the inlet end to x % of the substrate axial length with 0<x<100,
    wherein the platinum component is on a portion of the surface of the outlet channel walls and on at least a portion of the surface of the pores within the channel walls within the surface of the portions of the channel walls coated with the platinum component, wherein the portion of the outlet channel walls coated with the platinum component extends from the outlet end to 100-x % of the substrate axial length.

2. The catalyzed soot filter of claim 1, wherein x is in the range of from 5 to 95.

3. The catalyzed soot filter of claim 1, wherein the porous wall flow substrate is a honeycomb substrate with alternately plugged inlet and outlet ends such that each wall of the wall flow substrate respectively has a first surface which is a surface of an inlet channel and a second surface which is a surface of an outlet channel.

4. The catalyzed soot filter of claim 1, wherein the SCR catalyst comprises a zeolite.

5. The catalyzed soot filter of claim 4, wherein the zeolite comprises a transition metal.

6. The catalyzed soot filter of claim 1, wherein the average particle size D90 of the SCR catalyst is 25% or less of the average pore size of the walls of the substrate.

7. The catalyzed soot filter of claim 1, wherein the catalyzed soot filter is contained in an emissions treatment system further comprising an internal combustion engine located upstream of the catalyzed soot filter, wherein the internal combustion engine is in fluid communication with the catalyzed soot filter.

8. The catalyzed soot filter of claim 7, wherein the emissions treatment system further comprises a lean $NO_x$ trap (LNT) in fluid communication with the catalyzed soot filter, wherein the LNT is located upstream of the catalyzed soot filter.

9. A method of preparing a catalyzed soot filter comprising (i) providing a porous wall flow substrate comprising an inlet end, an outlet end, a substrate axial length extending between the inlet end and the outlet end, and a plurality of channels defined by internal walls of the wall flow substrate, wherein the plurality of channels comprise inlet channels having an open inlet end and a closed outlet end, and outlet channels having a closed inlet end and an open outlet end, (ii) mixing a particulate support material with distilled water and subsequently adding an aqueous solution of a palladium compound thereto, wherein the resulting mixture is optionally milled for providing a first slurry comprising a palladium component, wherein said first slurry displays an average particle size D90 which is 25% or less of the average pore size of the walls of the porous wall flow substrate, (iii) mixing a particulate support material with distilled water and subsequently adding an aqueous solution of a platinum compound thereto, wherein the resulting mixture is optionally milled for providing a second slurry comprising a platinum component, wherein said second slurry displays an average particle size D90 which is 25% or less of the average pore size of the walls of the porous wall flow substrate, (iv) suspending a solid SCR catalyst in distilled water and optionally milling the resulting mixture for providing a third slurry, wherein said third slurry displays an average particle size D90 which is 25% or less of the average pore size of the walls of the porous wall flow substrate, (v) coating a portion of the inlet channel walls of the wall flow substrate by immersing the inlet end of the wall flow substrate into the first slurry up to x % of the substrate axial length extending from the inlet end with $0<x<100$, (vi) removing the wall flow substrate from the first slurry and removing excess slurry from the inlet channels, (vii) coating a portion of the outlet channel walls of the wall flow substrate by immersing the outlet end of the wall flow substrate into the second slurry up to 100-x % of the substrate axial length extending from the outlet end, (viii) removing the wall flow substrate from the second slurry and removing excess slurry from the outlet channels, (ix) coating the inlet channel walls of the wall flow substrate by immersing the inlet end of the wall flow substrate into the third slurry along the entire axial length of the substrate yet without allowing slurry to contact the face of the outlet end of the wall flow substrate, (x) removing the wall flow substrate from the third slurry and removing excess slurry from the inlet channels, and (xi) optionally drying and/or calcining the coated wall flow substrate.

10. A catalyzed soot filter, which is obtained according to a method of claim 9.

11. A process for the treatment of emissions from an internal combustion engine, comprising:
    directing exhaust gas from an internal combustion engine through the inlet channels of a catalyzed soot filter according to claim 1.

12. The process of claim 11, wherein prior to directing the exhaust gas stream into the catalyzed soot filter, the exhaust gas stream is contacted with a diesel oxidation catalyst (DOC).

13. The process of claim 12, wherein prior to directing the exhaust gas stream into the catalyzed soot filter, the exhaust gas stream is contacted with a lean $NO_x$ trap (LNT).

* * * * *

UNITED STATES PATENT AND TRADEMARK OFFICE
CERTIFICATE OF CORRECTION

PATENT NO. : 10,215,073 B2  
APPLICATION NO. : 15/574910  
DATED : February 26, 2019  
INVENTOR(S) : Alfred Punke et al.

Page 1 of 1

It is certified that error appears in the above-identified patent and that said Letters Patent is hereby corrected as shown below:

In the Specification

In Column 7, Line 27, delete "4 to 6 $g/ft^a$," and insert -- 4 to 6 $g/ft^3$, --, therefor.

In Column 19, Line 39, delete "1.15 g/in." and insert -- 1.15 $g/in^3$. --, therefor.

In Column 23, Line 9, delete "channel" and insert -- channel. --, therefor.

In Column 23, Line 46, delete "chabazite" and insert -- chabazite. --, therefor.

In Column 24, Line 15, delete "20 g/ft" and insert -- 20 $g/ft^3$ --, therefor.

In Column 26, Line 35, delete "inch" and insert -- ¼ inch --, therefor.

In Column 27, Line 65, delete "$SiO_z$." and insert -- $SiO_2$. --, therefor.

In the Claims

In Column 30, Lines 62-63, Claim 8, delete "$NO_x$, trap" and insert -- $NO_x$ trap --, therefor.

Signed and Sealed this  
Fifth Day of May, 2020

Andrei Iancu  
*Director of the United States Patent and Trademark Office*